US012725988B2

(12) United States Patent
Sung

(10) Patent No.: US 12,725,988 B2
(45) Date of Patent: Sep. 1, 2026

(54) FUSE CARRIER MECHANISM AND CONNECTOR ASSEMBLY

(71) Applicant: BELLWETHER ELECTRONIC CORP., Taoyuan City (TW)

(72) Inventor: Tai-Ching Sung, Taoyuan City (TW)

(73) Assignee: BELLWETHER ELECTRONIC CORP., Taoyuan City (TW)

( * ) Notice: Subject to any disclaimer, the term of this patent is extended or adjusted under 35 U.S.C. 154(b) by 342 days.

(21) Appl. No.: 18/646,726

(22) Filed: Apr. 25, 2024

(65) Prior Publication Data

US 2025/0158338 A1 May 15, 2025

Related U.S. Application Data

(60) Provisional application No. 63/612,103, filed on Dec. 19, 2023.

(30) Foreign Application Priority Data

Nov. 10, 2023 (TW) ................................ 112212184

(51) Int. Cl.
*H01R 13/692* (2011.01)

(52) U.S. Cl.
CPC .................................. *H01R 13/692* (2013.01)

(58) Field of Classification Search
CPC .... H01R 13/692; H01H 85/202; H01H 85/22; H01H 85/547; H01H 85/0241
See application file for complete search history.

(56) References Cited

U.S. PATENT DOCUMENTS 10,395,878 B2 * 8/2019 Shah .................. H01H 85/0411
2019/0393625 A1 * 12/2019 Yamane ................. H01H 85/04

FOREIGN PATENT DOCUMENTS

| | | | |
|---|---|---|---|
| CN | 103904498 A | | 7/2014 |
| CN | 103904498 B | * | 10/2015 |
| TW | I805401 B | | 6/2023 |

* cited by examiner

*Primary Examiner* — Seung H Lee
(74) *Attorney, Agent, or Firm* — Li & Cai Intellectual Property Office

(57) ABSTRACT

A fuse carrier mechanism and a connector assembly are provided. The fuse carrier mechanism includes an insulation body, a conductive carrier seat, and a movable component. The conductive carrier seat is configured to carry a fuse, and the movable component is movably connected to the insulation body. Two ends of the movable component are respectively defined as an operation end and an insertion end. The movable component has a pushing surface, and a distance between the pushing surface and the insulation body gradually changes along a first direction. When the movable component moves in the first direction, and the pushing surface moves to a position between the fuse and the insulation body, the pushing surface pushes against the fuse. The first direction is not parallel to the second direction.

17 Claims, 10 Drawing Sheets

FUSE CARRIER MECHANISM AND CONNECTOR ASSEMBLY

CROSS-REFERENCE TO RELATED PATENT APPLICATION

This application claims the benefit of priorities to Taiwan Patent Application No. 112212184, filed on Nov. 10, 2023, and to the U.S. Provisional Patent Application Ser. No. 63/612,103, filed on Dec. 19, 2023. The entire content of each of the above identified applications is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a fuse carrier mechanism and a connector assembly, and more particularly to a fuse carrier mechanism and a connector assembly that can be installed without use of tools.

BACKGROUND OF THE DISCLOSURE

Conventional connectors provided with fuses (e.g., a bus bar connector applied in a server) are designed to protect other related electronic components through the fuse. In practice, in order to ensure good conductive contact between the fuse and the conventional connector, the fuse is fixedly connected to the conventional connector by at least one bolt. However, this may lead to difficulty in disassembly and assembly of the fuse.

SUMMARY OF THE DISCLOSURE

In response to the above-referenced technical inadequacy, the present disclosure provides a fuse carrier mechanism and a connector assembly, which are mainly configured to improve on an issue associated with having difficulty to disassemble and replace a fuse in a conventional connector.

In order to solve the above-mentioned problem, one of the technical aspects adopted by the present disclosure is to provide a fuse carrier mechanism. The fuse carrier mechanism includes an insulation body, a conductive carrier seat, and a movable component. The conductive carrier seat is configured to carry a fuse, and the movable component is movably connected to the insulation body. Two ends of the movable component are respectively defined as an operation end and an insertion end. The movable component has a pushing surface, and a distance between the pushing surface and the insulation body gradually changes along a first direction. When the movable component moves in the first direction, and a section of the pushing surface that is adjacent to the insertion end moves to a position between the fuse and the insulation body, the pushing surface pushes against the fuse, such that the fuse moves away from the conductive carrier seat in a second direction. The first direction is not parallel to the second direction.

In order to solve the above-mentioned problem, another one of the technical aspects adopted by the present disclosure is to provide a connector assembly. The connector assembly includes a plurality of connection cables, a connector, and a fuse carrier mechanism. The connector includes an insulation seat and two connection terminal sets. The two connection terminal sets are spaced apart from each other and electrically isolated from each other. The two connection terminal sets are disposed in the insulation seat, and one of the connection terminal sets is electrically connected to at least one of the connection cables. The fuse carrier mechanism is connected to the connector, and the fuse carrier mechanism includes an insulation body, a conductive carrier seat, and a movable component. The conductive carrier seat is configured to carry a fuse, and the conductive carrier seat is electrically connected between the other connection terminal set and another one of the connection cables. The movable component is connected to the insulation body. Two ends of the movable component are respectively defined as an operation end and an insertion end. The movable component has a pushing surface, and a distance between the pushing surface and the insulation body gradually changes along a first direction. When the movable component moves in the first direction, and a section of the pushing surface that is adjacent to the insertion end moves to a position between the fuse and the insulation body, the pushing surface pushes against the fuse, such that the fuse moves away from the conductive carrier seat in a second direction. The first direction is not parallel to the second direction.

In order to solve the above-mentioned problem, yet another one of the technical aspects adopted by the present disclosure is to provide a connector assembly. The connector assembly includes an insulation seat, two connection terminal sets, two holding components, a movable component, and a plurality of connection cables. The two connection terminal sets are spaced apart from each other and electrically isolated from each other. The two connection terminal sets are disposed in the insulation seat. The two holding components are configured to carry a fuse. One of the two holding components is electrically connected to one of the two connection terminal sets. The movable component has a pushing surface. At least one of the connection cables is electrically connected to another one of the two connection terminal sets, and another one of the connection cables is electrically connected to another one of the two holding components. When the movable component moves toward the fuse from a first position to a second position, the pushing surface pushes against the fuse, such that the fuse is moved away from the two holding components.

Therefore, in the fuse carrier mechanism and the connector assembly provided by the present disclosure, through cooperation of the insulating body, the conductive carrier seat, and the movable component, the movable component can be easily manipulated by a user, such that the fuse can be easily pushed out of the fuse carrier mechanism.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
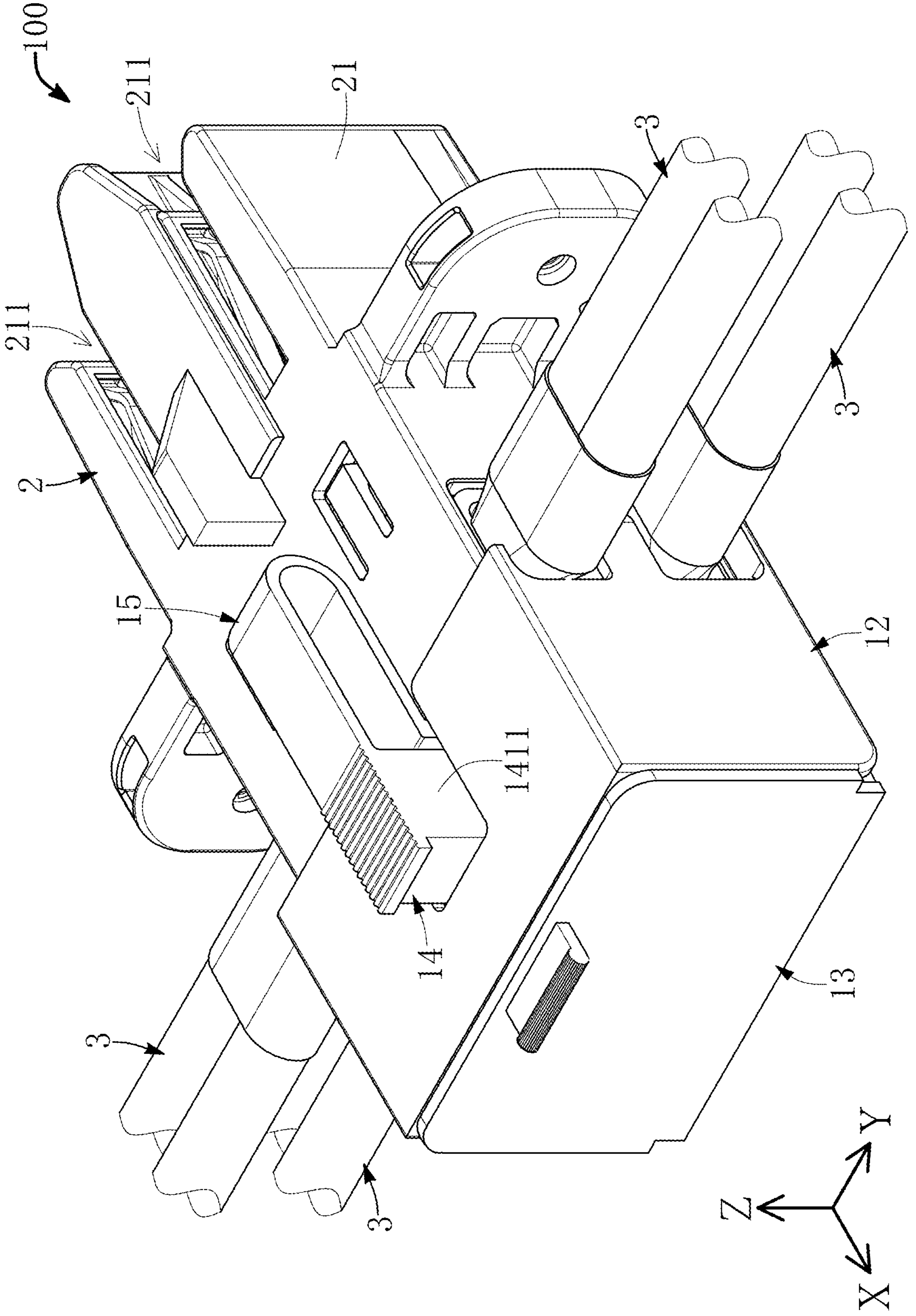
FIG. 1 and FIG. 2 are schematic views of a connector assembly according to the present disclosure from different angles of view.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Embodiment

Figure 2:
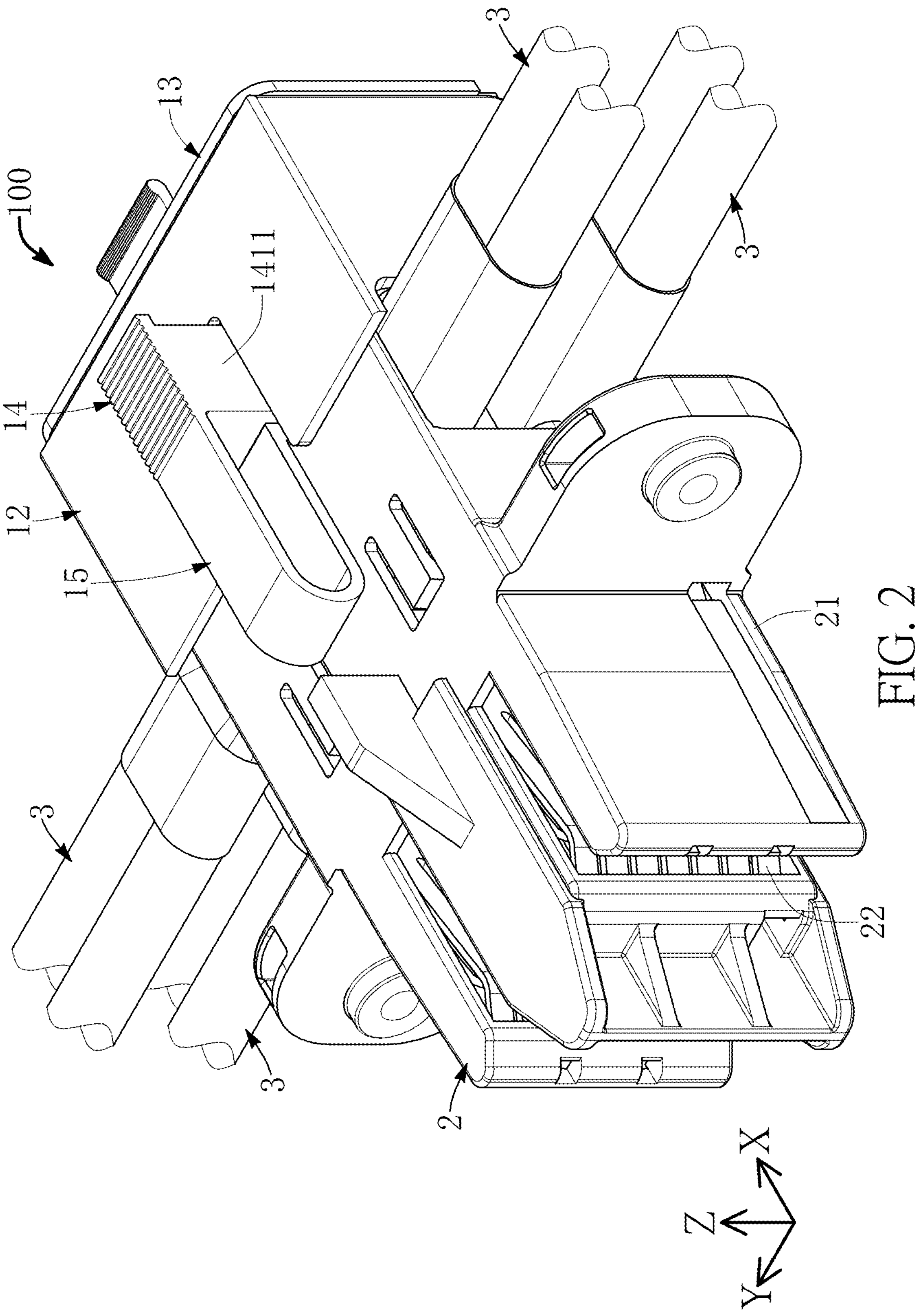
Figure 3:
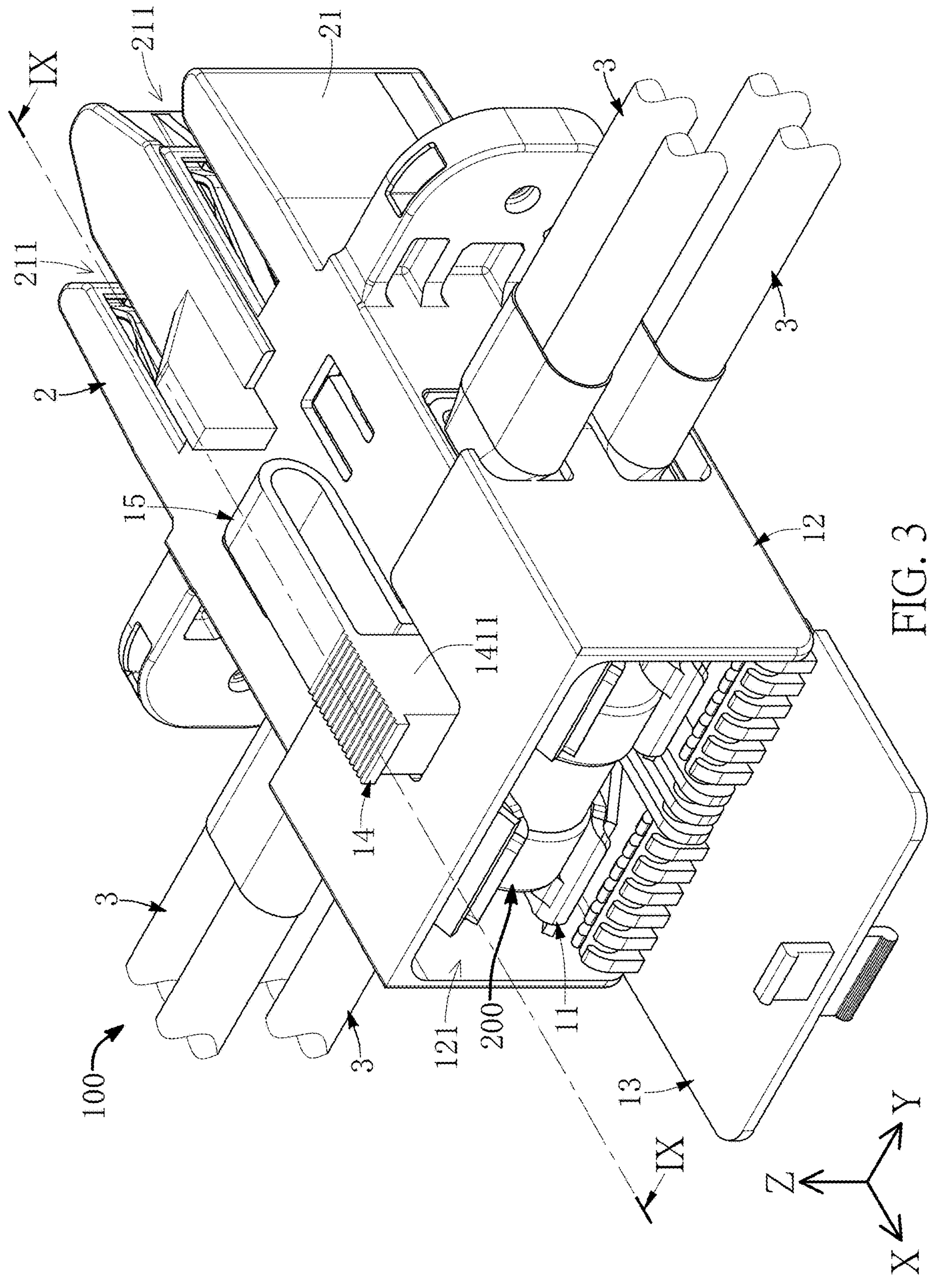
FIG. 3 is a schematic view showing the connector assembly being provided with a fuse according to the present disclosure.
Figure 4:
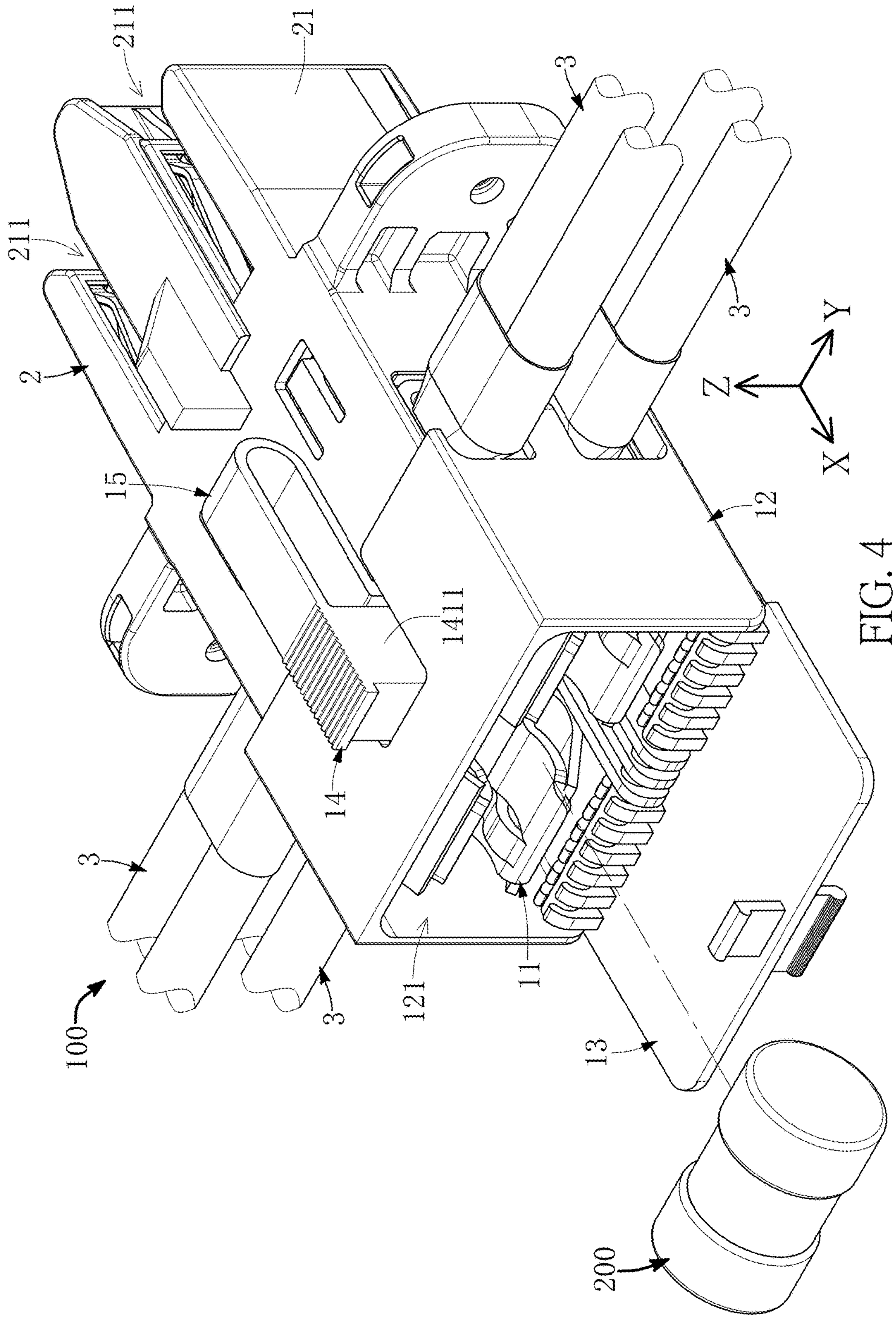
FIG. 4 is a schematic view showing the connector assembly not being provided with the fuse according to the present disclosure.
Figure 5:
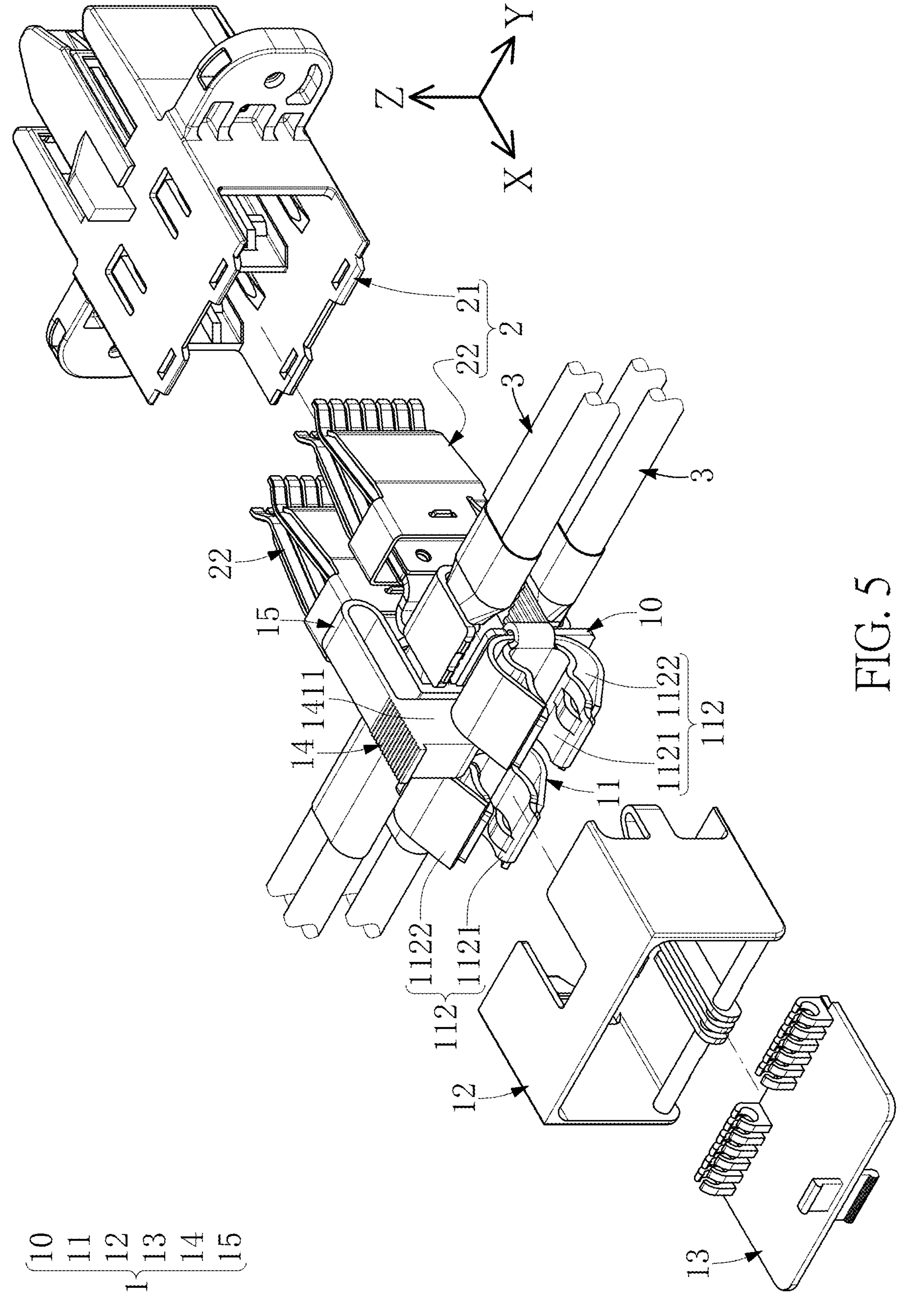
FIG. 5 is a schematic exploded view of the connector assembly according to the present disclosure.

As shown in FIG. 1 to FIG. 5, FIG. 1 and FIG. 2 are schematic views of a connector assembly according to the present disclosure from different angles of view, FIG. 3 is a schematic view showing the connector assembly being provided with a fuse according to the present disclosure, FIG. 4 is a schematic view showing the connector assembly not being provided with the fuse according to the present disclosure, and FIG. 5 is a schematic exploded view of the connector assembly according to the present disclosure.

A connector assembly 100 of the present disclosure includes a fuse carrier mechanism 1, a connector 2, and a plurality of connection cables 3. The connector 2 includes an insulation seat 21 and two connection terminal sets 22. The two connection terminal sets 22 are spaced apart from each other and are electrically isolated from each other, and the two connection terminal sets 22 are disposed in the insulation seat 21. The insulation seat 21 further includes at least one insertion slot 211, and a quantity of the at least one insertion slot 211 in the present embodiment is more than one. Moreover, the two connection terminal sets 22 can be respectively disposed in the insertion slots 211 (as shown in FIG. 1 and FIG. 2), or each of the connection terminal sets 22 can be disposed at two sides of an insertion slot. Each of the insertion slots 211 is configured to allow for insertion of a copper bar or a sheet-like power supply component, such that the copper bar or the sheet-like power supply component is electrically connected to the two connection terminal sets 22. One of the connection terminal sets 22 is connected to at least one of the connection cables 3, another one of the connection terminal sets 22 is connected to one of two holding components 112 of the fuse carrier mechanism 1, and another one of the two holding components 112 of the fuse carrier mechanism 1 is connected to another one of the connection cables 3. The two holding components 112 are electrically connected to each other through a fuse 200. In the drawings of present embodiment, a quantity of the fuse 200 carried by the connector assembly 100 is one, but the quantity of the fuse 200 carried by the connector assembly 100 is not limited thereto.

Figure 6:
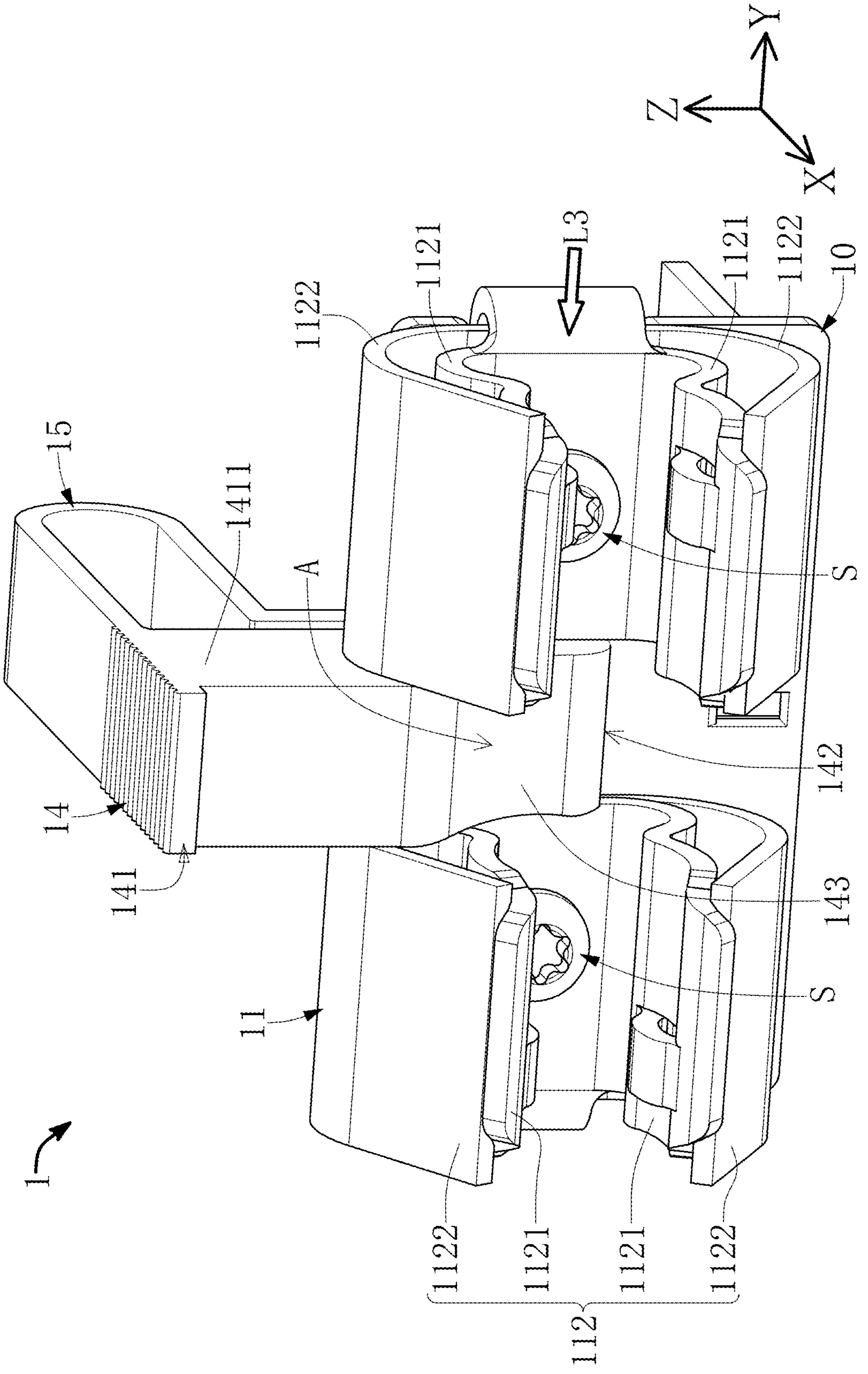
FIG. 6 and FIG. 7 are schematic views of a fuse carrier mechanism according to the present disclosure from different angles of view.
Figure 7:
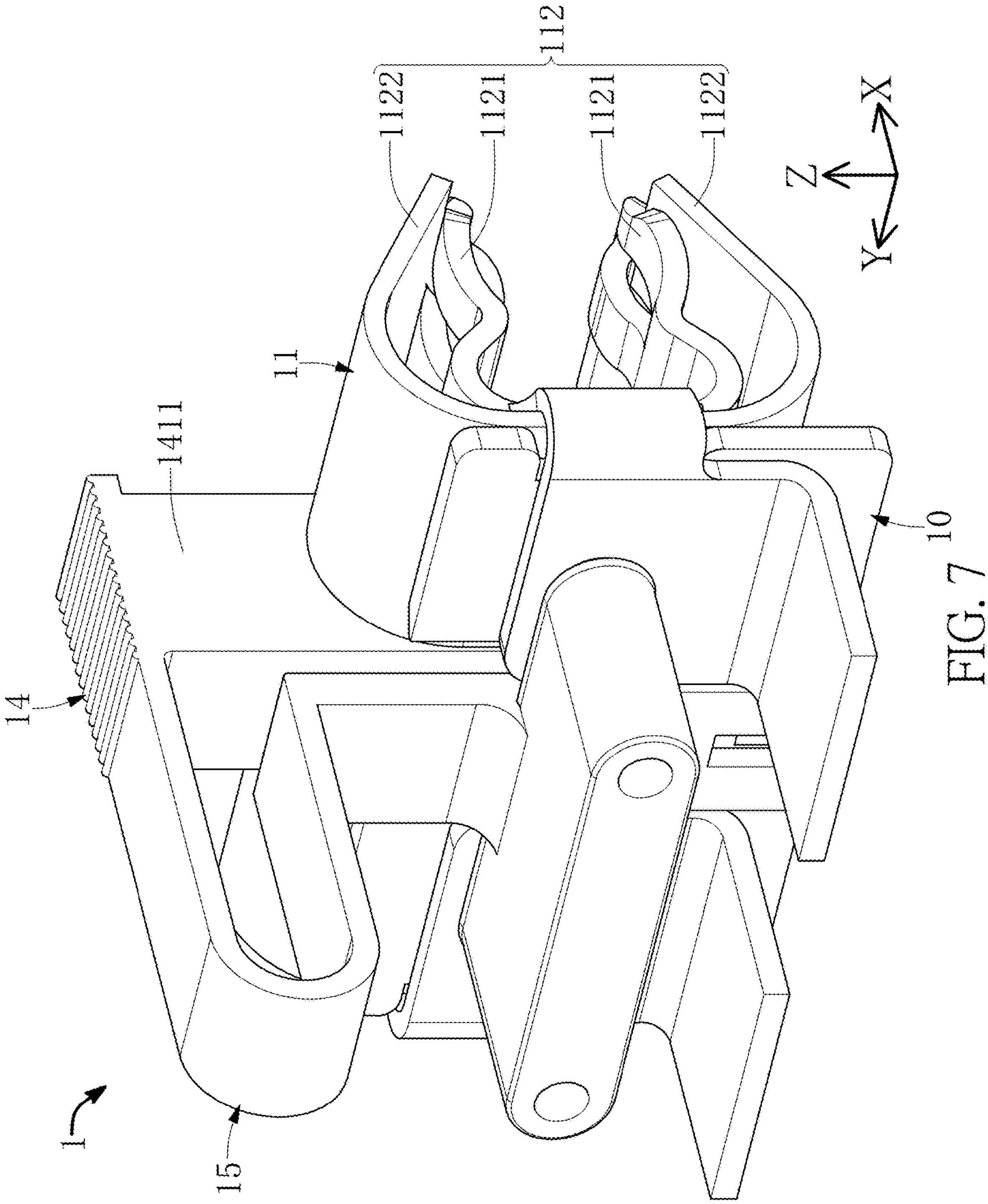
Figure 8:
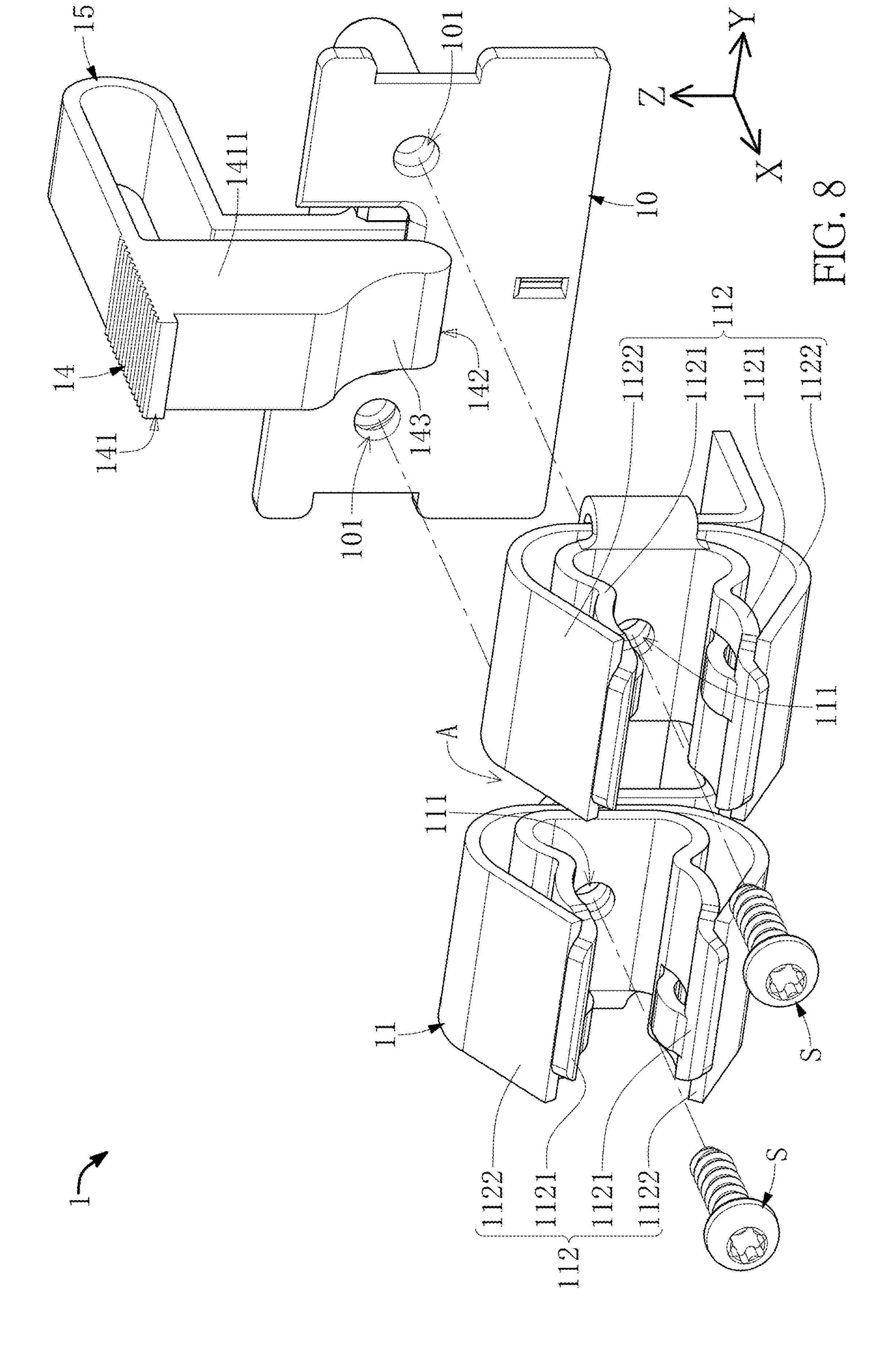
FIG. 8 is a schematic exploded view of the fuse carrier mechanism according to the present disclosure.
Figure 9:
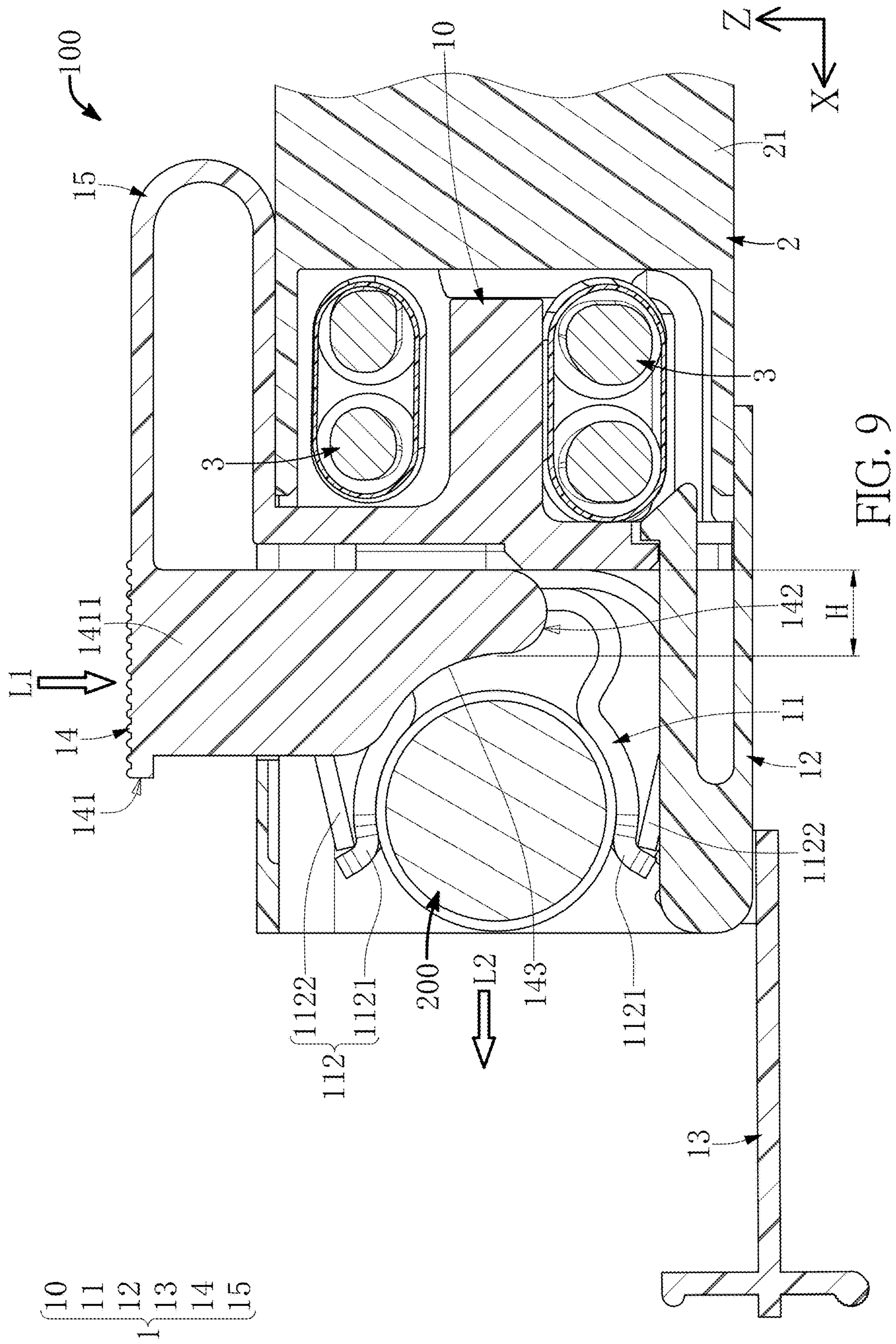
FIG. 9 is a schematic cross-sectional view taken along line IX-IX of FIG. 3.

Referring to FIG. 1, and FIG. 4 to FIG. 9, FIG. 6 and FIG. 7 are schematic views of a fuse carrier mechanism according to the present disclosure from different angles of view, FIG. 8 is a schematic exploded view of the fuse carrier mechanism according to the present disclosure, and FIG. 9 is a schematic cross-sectional view taken along line IX-IX of FIG. 3.

The fuse carrier mechanism 1 includes an insulation body 10, a conductive carrier seat 11, an insulation housing 12, a cap 13, a movable component 14, and an elastic structure 15. The insulation body 10 and the conductive carrier seat 11 are fixed to each other. In practice, the insulation body 10 has two threaded holes 101, the conductive carrier seat 11 has two threaded holes 111, and the insulation body 10 and the conductive carrier seat 11 can be fixed to each other through two screws S.

The insulation housing 12 is connected to the insulation body 10 (e.g., through a relevant engaging structure), the cap 13 is movably (e.g., rotatably) connected to the insulation housing 12, and the cap 13 is configured to cover or shield an opening 121 of the insulation housing 12. The fuse 200 can be inserted into the conductive carrier seat 11 through the opening 121. The cap 13 and the insulation housing 12 can jointly form an accommodating space for accommodating the conductive carrier seat 11, and the conductive carrier seat 11 is disposed in the accommodating space. One end of the insulation housing 12 that is without the cap 13 (and opposite to another end of the insulation housing 12 having the cap 13) can be connected to the insulation seat 21 of the connector 2 (e.g., through a relevant engaging structure).

As shown in FIG. 6 to FIG. 8, the conductive carrier seat 11 can, for example, include the two holding components 112, and each of the two holding components 112 includes two conductive clamp arms 1121 and two elastic members 1122. The two conductive clamp arms 1121 face each other, and each of the elastic members 1122 is disposed at an outer side of a corresponding one of the conductive clamp arms 1121. Free ends of the two conductive clamp arms 1121 jointly define an opening for entrance or exit of the fuse 200. The two conductive clamp arms 1121 of each of the two holding components 112 can clamp at least a part of the fuse 200. The conductive clamp arms 1121 and the elastic members 1122 are made of different materials, an electrical conductivity of the conductive clamp arm 1121 is higher than an electrical conductivity of the elastic member 1122, and an elastic coefficient of the elastic member 1122 is higher than an elastic coefficient of the conductive clamp arm 1121.

When the conductive clamp arms 1121 of the two holding components 112 respectively hold two ends of the fuse 200, the two elastic members 1122 are elastically deformed to provide the two conductive clamp arms 1121 with a force that can firmly clamp the fuse 200. The two holding components 112 can hold the two ends of the fuse 200, but are not limited thereto. In different embodiments, the two holding components 112 can also hold multiple ones of the fuse 200. That is, each of the two holding components 112 has multiple pairs of the conductive clamp arms 1121 that are electrically connected to each other and corresponding ones of the elastic members 1122 for clamping one end of one of the fuses 200.

The movable component 14 may be connected to the insulation body 10 through the elastic structure 15. At least a part of the elastic structure 15 may be a C-shaped structure, the movable component 14 is connected to one end of the elastic structure 15, and another end of the elastic structure 15 is connected to the insulation body 10. When the movable component 14 is pressed and moves toward the insulation body 10, the movable component 14 can drive the elastic structure 15, such that the elastic structure 15 is elastically deformed. When the movable component 14 is no longer pressed, an elastic recovery force generated in the pressed elastic structure 15 can restore the movable component 14 to an original position (a first position) before being pressed.

In different embodiments, the elastic structure 15 can further include a spring. When the movable component 14 is pressed from the first position to a second position, the spring is pressed to generate an elastic recovery force for moving the movable component 14 toward the first position. When the movable component 14 is no longer pressed, the elastic recovery force of the spring restores the movable component 14 to the first position.

It should be noted that, in different embodiments, the fuse carrier mechanism 1 can be provided without the elastic structure 15, and the movable component 14 is movably connected to the insulation body 10. For example, the insulation body 10 can include a slot, the movable component 14 can be a slider, and the movable component 14 is slidably connected to the slot. In such a configuration, when the movable component 14 is applied with a force (e.g., a pushing force or a pulling force), the movable component 14 can move along the slot. Naturally, after the movable component 14 moves to the second position due to application of the force, the movable component 14 does not automatically return to the first position. When a user installs the fuse 200 by pushing the fuse 200 into the conductive carrier seat 11, the fuse 200 can push against (a pushing surface of) the movable component 14 at the second position, so as to restore the movable component 14 to the first position.

As shown in FIG. 8 and FIG. 9, two ends of the movable component 14 are respectively defined as an operation end 141 and an insertion end 142. The operation end 141 is exposed from the insulation housing 12, and the operation end 141 has a pressed portion 1411 that allows the user to press thereon. The movable component 14 has a pushing surface 143, and the pushing surface 143 is disposed adjacent to the insertion end 142. A horizontal distance H between the pushing surface 143 and the insulation body 10 gradually changes (e.g., decreases or increases) along a first direction L1, and the pushing surface 143 can be, for example, a curved surface. In different embodiments, the pushing surface 143 can also be an inclined and flat surface. In other words, a thickness of the movable component 14 can vary (e.g., gradually decreases or increases) along a movable direction.

As shown in FIG. 6, the two holding components 112 can be spaced apart from each other, and can be disposed on the insulation body 10. A gap A is formed between the two holding components 112. When the movable component 14 is not pressed, a part of the insertion end 142 of the movable component 14 is correspondingly disposed in the gap A. That is to say, the part of the insertion end 142 of the movable component 14 is disposed between the two holding components 112.

When the movable component 14 is pressed, the movable component 14 can move toward the fuse 200 along the first direction L1, and at least a part of the insertion end 142 can be correspondingly inserted between the fuse 200 and the insulation body 10. Since the movable component 14 is disposed in the gap A between the two holding components 112, after the movable component 14 is pressed, the two holding components 112 can limit the movable component 14 to be moving along the first direction L1. Naturally, in different embodiments, various auxiliary methods can also be adopted to limit a movement path of the movable component 14. For example, the insulation body 10 can have a slide rail, the movable component 14 can be a slider, and the movable component 14 is slidably connected to the slide rail. Alternatively, on the movement path of the movable component 14, the insulation body 10 is provided with a guide structure, such that the movable component 14 can only move along the first direction L1 through the guide structure.

Figure 10:
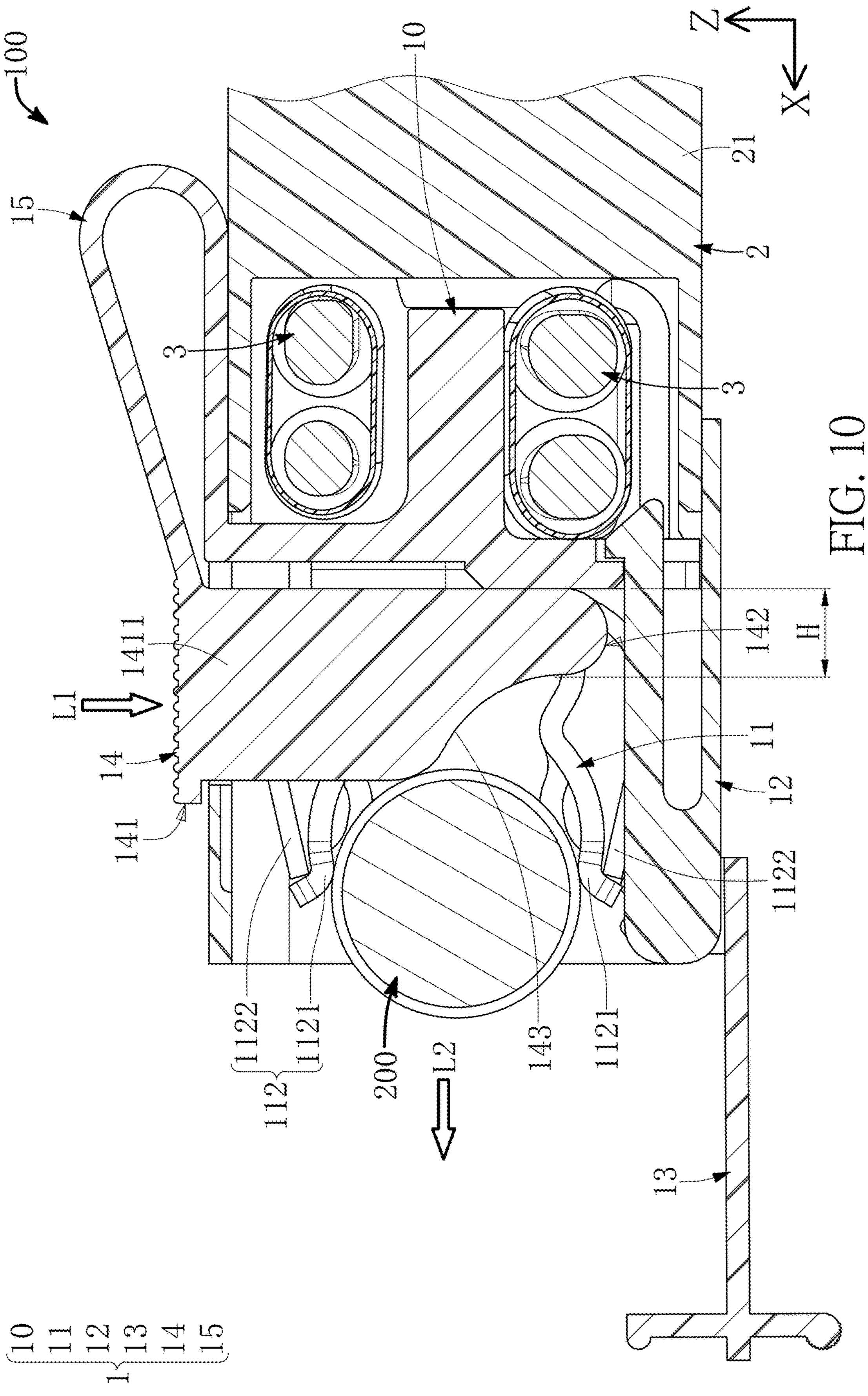
FIG. 10 is a schematic view showing a movable component of FIG. 9 after actuation.

Reference is to FIG. 1, FIG. 3, FIG. 6, FIG. 9, and FIG. 10. FIG. 10 is a schematic view showing a movable component of FIG. 9 after actuation.

As shown in FIG. 3, FIG. 6, and FIG. 9, when the fuse 200 is held by the two holding components 112, and the movable component 14 is not pressed, the movable component 14 is at the first position. As shown in FIG. 10, when the movable component 14 is pressed, and the movable component 14 moves to the second position along the first direction L1, and the pushing surface 143 pushes against the fuse 200. Accordingly, the fuse 200 moves away from the two holding components 112 in the second direction L2, and the fuse 200 is pushed out of the fuse carrier mechanism 1. The first direction L1 may be different from the second direction L2, and the first direction L1 is not parallel to the second direction L2. For example, the first direction L1 can be perpendicular to the second direction L2.

It is worth mentioning that, in different embodiments, the first direction L1 can be parallel to the second direction L2. For example, the slide rail of the insulation body 10 is parallel to the second direction L2. After the movable component 14 is manipulated, the pushing surface 143 pushes against the fuse 200 by moving in the second direction L2 from a side of the fuse 200 that faces the insulation body 10. In this way, the side of the fuse 200 that faces the insulation body 10 is detached from the two holding components 112 along the second direction L2, and the fuse 200 is pushed out of the fuse carrier mechanism 1.

The pushing surface 143 can be a flat surface, a convex curved surface, or a concave curved surface.

Reference is made to FIG. 6. It is worth mentioning that, in different embodiments, the position of the movable component 14 can also be changed, such that the movable component 14 can move in a third direction L3 (as shown in FIG. 6) when being pressed. Accordingly, the insertion end 142 of the movable component 14 can be inserted between the fuse 200 and the two holding components 112, and each part of the fuse 200 can sequentially move in the second direction L2, so as to move away from the fuse carrier mechanism 1.

In one variant embodiment of the present disclosure, a quantity of the movable component 14 included in the connector assembly 100 can be two, and the two movable components 14 are respectively disposed on two opposite sides of the insulation housing 12. The fuse carrier mechanism 1 of the connector assembly 100 is configured to carry the two fuses 200, and each of the movable components 14 is disposed adjacent to one of the fuses 200 carried by the fuse carrier mechanism 1. When the user presses any one of the movable components 14 or simultaneously presses the two movable components 14, a corresponding one of the fuses 200 is pushed out of the fuse carrier mechanism 1. In another variant embodiment, a movable distance (i.e., a distance from the first position to the second position) of the movable component 14 is longer, the fuses 200 are arranged in a row, and the fuses 200 are disposed on the movement path of the movable component 14 from the first position to the second position. Accordingly, after one single movable component 14 is pressed, the fuses 200 can be pushed out of the fuse carrier mechanism 1 by said movable component 14.

Beneficial Effects of the Embodiment

In conclusion, in the connector assembly 100 and the fuse carrier mechanism 1 provided by the present disclosure, through configuration of the movable component 14, the pushing surface 143, and the conductive carrier seat 11, the movable component 14 can be easily manipulated by the user, such that the fuse 200 can be easily pushed out of the fuse carrier mechanism 1. During this process, the user does not need any other tools.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A fuse carrier mechanism, comprising:
an insulation body;
a conductive carrier seat configured to carry a fuse; and
a movable component movably connected to the insulation body, wherein two ends of the movable component are respectively defined as an operation end and an insertion end, and wherein the movable component has a pushing surface, and a distance between the pushing surface and the insulation body gradually changes along a first direction;
wherein, when the movable component moves in the first direction, and a section of the pushing surface that is adjacent to the insertion end moves to a position between the fuse and the insulation body, the pushing surface pushes against the fuse, such that the fuse moves away from the conductive carrier seat in a second direction, and wherein the first direction is not parallel to the second direction.

2. The fuse carrier mechanism according to claim 1, further comprising an elastic structure, wherein the movable component is connected to the insulation body through the elastic structure, and wherein, when the movable component is manipulated to move in the first direction, the elastic structure is elastically deformed.

3. The fuse carrier mechanism according to claim 1, wherein the conductive carrier seat includes at least two holding components, the at least two holding components are spaced apart from each other and connected to the insulation body, and each of the at least two holding components includes at least two conductive clamp arms, wherein the at least two conductive clamp arms of each of the at least two holding components are configured to jointly clamp at least a part of the fuse, so that the at least two conductive clamp arms are electrically connected to each other, and a part of the fuse is exposed from a gap between the at least two holding components, and wherein, when the movable component moves in the first direction, the pushing surface of the movable component pushes against the part of the fuse that is exposed from the gap.

4. The fuse carrier mechanism according to claim 1, further comprising an insulation housing and a cap, wherein the conductive carrier seat is disposed in the insulation housing, a part of the operation end of the movable component is exposed from the insulation housing, and the cap is movably connected to the insulation housing.

5. The fuse carrier mechanism according to claim 1, wherein the pushing surface is an inclined flat surface or a curved surface.

6. A connector assembly, comprising:
a plurality of connection cables;
a connector, wherein the connector includes:
an insulation seat; and
two connection terminal sets spaced apart from each other and electrically isolated from each other, wherein the two connection terminal sets are disposed in the insulation seat, and one of the two connection terminal sets is electrically connected to at least one of the connection cables; and
a fuse carrier mechanism connected to the connector, wherein the fuse carrier mechanism includes:
an insulation body;
a conductive carrier seat configured to carry a fuse, wherein the conductive carrier seat is electrically connected between the other connection terminal set and another one of the connection cables; and
a movable component connected to the insulation body, wherein two ends of the movable component are respectively defined as an operation end and an insertion end, and wherein the movable component has a pushing surface, and a distance between the pushing surface and the insulation body gradually changes along a first direction;
wherein, when the movable component moves in the first direction, and a section of the pushing surface that is adjacent to the insertion end moves to a position between the fuse and the insulation body, the pushing surface pushes against the fuse, such that the fuse moves away from the conductive carrier seat in a second direction, and wherein the first direction is not parallel to the second direction.

7. The connector assembly according to claim 6, further comprising an elastic structure, wherein the movable component is connected to the insulation body through the elastic structure, and wherein, when the movable component is manipulated to move in the first direction, the elastic structure is elastically deformed.

8. The connector assembly according to claim 6, wherein the conductive carrier seat includes at least two holding components, the at least two holding components are spaced apart from each other and connected to the insulation body, and each of the at least two holding components includes at least two conductive clamp arms, wherein the at least two conductive clamp arms of each of the at least two holding components are configured to jointly clamp at least a part of the fuse, so that a part of the fuse is exposed from a gap between the at least two holding components, and wherein, when the movable component moves in the first direction, the pushing surface of the movable component pushes against the part of the fuse that is exposed from the gap.

9. The connector assembly according to claim 6, further comprising an insulation housing and a cap, wherein the conductive carrier seat is disposed in the insulation housing, a part of the operation end of the movable component is exposed from the insulation housing, and the cap is movably connected to the insulation housing.

10. The connector assembly according to claim 6, wherein the pushing surface is an inclined flat surface or a curved surface.

11. A connector assembly, comprising:

an insulation seat;

two connection terminal sets spaced apart from each other and electrically isolated from each other, wherein the two connection terminal sets are disposed in the insulation seat;

two holding components configured to carry a fuse, wherein one of the two holding components is electrically connected to one of the two connection terminal sets;

a movable component having a pushing surface; and a plurality of connection cables, wherein at least one of the connection cables is electrically connected to another one of the two connection terminal sets, and another one of the connection cables is electrically connected to another one of the two holding components;

wherein, when the movable component moves toward the fuse from a first position to a second position, the pushing surface pushes against the fuse, such that the fuse moves away from the two holding components.

12. The connector assembly according to claim 11, further comprising an insulation housing and a cap, wherein the two holding components are disposed in the insulation housing, a part of the movable component is exposed from the insulation housing, and the cap is movably connected to the insulation housing.

13. The connector assembly according to claim 11, wherein each of the two holding components includes two conductive clamp arms and two elastic members, the two conductive clamp arms face each other, and the two elastic members are disposed at an outer side of the two conductive clamp arms.

14. The connector assembly according to claim 11, further comprising an elastic structure, wherein the elastic structure is connected to the movable component, and wherein, when the movable component is disposed at the second position, the elastic structure provides an elastic recovery force to the movable component for moving toward the first position.

15. The connector assembly according to claim 11, wherein the movable component has an operation end and an insertion end, the insertion end has the pushing surface, and the insertion end is disposed at a gap between the two holding components.

16. The connector assembly according to claim 11, wherein the insulation seat includes at least one insertion slot for insertion of at least one sheet-like power supply component, such that the at least one sheet-like power supply component is electrically connected to the two connection terminal sets.

17. The connector assembly according to claim 11, wherein the pushing surface is an inclined flat surface or a curved surface.

* * * * *